United States Patent
Fontenot et al.

(10) Patent No.: US 6,479,061 B2
(45) Date of Patent: Nov. 12, 2002

(54) ABSORBENT STRUCTURE INCLUDING A THIN, CALENDERED AIRLAID COMPOSITE AND A PROCESS FOR MAKING THE COMPOSITE

(75) Inventors: Monica C. Fontenot, Marietta, GA (US); Terry Pearce Ford, Woodstock, GA (US); James Jay Tanner, Winnenconne, WI (US); Jonathan Robert Owen, Eagan, MN (US); John Joseph Lassig, Lawrenceville, GA (US); Barbara Jean Burns, Appleton, WI (US); Alan Grady Shuman, Woodstock, GA (US); Victor Michael Gentile, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 10/008,860

(22) Filed: Oct. 26, 2001

(65) Prior Publication Data

US 2002/0068081 A1 Jun. 6, 2002

Related U.S. Application Data

(62) Division of application No. 09/290,713, filed on Apr. 12, 1999, now Pat. No. 6,368,609.
(60) Provisional application No. 60/111,671, filed on Dec. 10, 1998.

(51) Int. Cl.$^7$ ................... A01N 25/34; A61F 13/00; B32B 7/02; B32B 27/04
(52) U.S. Cl. ............... 424/404; 424/402; 424/443; 428/221; 428/297.4; 604/373
(58) Field of Search ............... 424/404, 402, 424/443; 428/221, 297.4; 604/372

(56) References Cited

U.S. PATENT DOCUMENTS 3,341,394 A 9/1967 Kinney (List continued on next page.)

FOREIGN PATENT DOCUMENTS

| DE | 2234008 | 7/1972 |
|---|---|---|
| EP | 0070164 A2 | 1/1983 |
| EP | 0210968 A2 | 2/1987 |
| EP | 0340763 A1 | 11/1989 |

(List continued on next page.)

OTHER PUBLICATIONS

PULPEX® Polyolefin Pulps Product Brochure, Hercules Incorporated, (Jan. 1987).

(List continued on next page.)

*Primary Examiner*—Thurman K. Page
*Assistant Examiner*—Isis A-D-Ghali
(74) *Attorney, Agent, or Firm*—Lisa J. Moyles; William D. Herrick; Douglas H. Tulley, Jr.

(57) ABSTRACT

The present invention pertains to an airlaid composite which is made of pulp fibers, at least about 2% by weight bicomponent fiber, and moisture. This airlaid composite is unique in that a uniformly even composite is made which upon calendering, becomes a thin structure which maintains significant absorbency when saturated. The bicomponent fibers of the present invention include a first polymer component and a second polymer component, and the first polymer component melts at a temperature lower than the melting temperature of the second polymer component. Mixing of the pulp fibers with the bicomponent fibers is done in such a way that the fibers are evenly dispersed in the airlaid composite. This airlaid composite is then heated such that at least a portion of the first polymer component of the bicomponent fiber is melted, which bond the bicomponent fibers to many of the pulp and bicomponent fibers when cooled. Moisture is added on to the composite to further facilitate bonding when the composite is subsequently subjected to calendering. Optionally, a sheet layer may be attached to the airlaid composite to form a multi-layered absorbent structure. Such composites and absorbent structures are characterized by a drape stiffness of at least about 5 cm, an absorbency of at least about 12 g/g, and a dry tensile strength of at least about 1300.

13 Claims, 6 Drawing Sheets

U.S. PATENT DOCUMENTS

| | | |
|---|---|---|
| 3,342,613 A | 9/1967 | Schelhorn |
| 3,494,362 A | 2/1970 | Burgeni |
| 3,551,271 A | 12/1970 | Thomas et al. |
| 3,589,364 A | 6/1971 | Dean et al. |
| 3,955,577 A | 5/1976 | Gellert et al. |
| 4,057,061 A | 11/1977 | Ishikawa et al. |
| 4,100,324 A | 7/1978 | Anderson et al. |
| 4,234,655 A | 11/1980 | Kunimune et al. |
| 4,252,761 A | 2/1981 | Schoggen et al. |
| 4,275,811 A | 6/1981 | Miller |
| 4,321,997 A | 3/1982 | Miller |
| 4,323,626 A | 4/1982 | Kunimune et al. |
| 4,382,507 A | 5/1983 | Miller |
| 4,410,578 A | 10/1983 | Miller |
| 4,458,042 A | 7/1984 | Espy |
| 4,530,353 A | 7/1985 | Lauritzen |
| 4,536,432 A | 8/1985 | Holtman |
| 4,551,377 A | 11/1985 | Elves et al. |
| 4,590,114 A | 5/1986 | Holtman |
| 4,640,810 A | 2/1987 | Laursen et al. |
| 4,655,877 A | 4/1987 | Horimoto et al. |
| 4,702,377 A | 10/1987 | Grone |
| 4,732,809 A * | 3/1988 | Harris et al. ............... 428/373 |
| 4,865,855 A | 9/1989 | Hansen et al. |
| 4,883,479 A | 11/1989 | Piron et al. |
| 4,886,697 A | 12/1989 | Perdelwitz, Jr. et al. |
| 4,929,480 A | 5/1990 | Midkiff et al. |
| 4,950,541 A | 8/1990 | Tabor et al. |
| 4,980,226 A | 12/1990 | Hellgren et al. |
| 5,019,063 A | 5/1991 | Marsan et al. |
| 5,064,689 A | 11/1991 | Young, Sr. et al. |
| 5,139,861 A | 8/1992 | Williams et al. |
| 5,143,779 A | 9/1992 | Newkirk et al. |
| 5,204,173 A | 4/1993 | Canary |
| 5,217,445 A | 6/1993 | Young et al. |
| 5,225,500 A | 7/1993 | Eider et al. |
| 5,230,959 A | 7/1993 | Young, Sr. et al. |
| 5,231,122 A | 7/1993 | Palumbo et al. |
| 5,246,772 A | 9/1993 | Manning |
| 5,252,275 A | 10/1993 | Sultze et al. |
| 5,391,161 A | 2/1995 | Hellgren et al. |
| 5,405,342 A | 4/1995 | Roessler et al. |
| 5,516,569 A | 5/1996 | Veith et al. |
| 5,547,745 A | 8/1996 | Hansen et al. |
| 5,567,501 A | 10/1996 | Srinivasan et al. |
| 5,589,256 A | 12/1996 | Hansen et al. |
| 5,591,153 A | 1/1997 | Mattingly, III |
| 5,634,915 A | 6/1997 | Osterdahl |
| 5,667,864 A | 9/1997 | Landoll |
| 5,681,300 A | 10/1997 | Ahr et al. |
| 5,728,085 A | 3/1998 | Widlund et al. |
| 5,730,737 A | 3/1998 | Widlund et al. |
| 5,779,860 A * | 7/1998 | Hollenberg et al. |
| 5,789,076 A | 8/1998 | Isohata |
| 5,804,241 A | 9/1998 | Isohata |
| 5,814,034 A | 9/1998 | Widlund et al. |
| 5,817,085 A | 10/1998 | Widlund et al. |
| 5,877,097 A | 3/1999 | West et al. |

FOREIGN PATENT DOCUMENTS

| | | | |
|---|---|---|---|
| EP | 0353334 A1 | 2/1990 | |
| EP | 426227 A2 | 5/1991 | |
| EP | 0438113 A1 | 7/1991 | |
| EP | 0480724 A1 | 4/1992 | |
| EP | 0518291 A1 | 12/1992 | |
| EP | 0518291 B1 | 12/1992 | |
| EP | 0621082 A1 | 10/1994 | |
| EP | 0 621 082 * | 10/1994 | |
| EP | 360472 B1 | 11/1994 | |
| EP | 0403187 B1 | 2/1996 | |
| EP | 637952 B1 | 10/1996 | |
| EP | 0680302 B1 | 7/1997 | ........... A61F/13/15 |
| FR | 1059617 | 3/1954 | |
| FR | 1524804 | 5/1968 | |
| GB | 1500053 | 2/1978 | |
| GB | 2155853 A | 10/1985 | |
| GB | 2 325 195 * | 9/1998 | |
| GB | 2 325 195 A | 11/1998 | ............. B32B/5/18 |
| WO | 89/10109 | 11/1989 | |
| WO | 91/01396 | 2/1991 | |
| WO | 91/11162 | 8/1991 | |
| WO | 91/11165 | 8/1991 | |
| WO | 98/45519 | 10/1998 | |
| WO | WO 98/45519 * | 10/1998 | |
| WO | 98/52745 | 11/1998 | |

OTHER PUBLICATIONS

Absorbent Products Conference, Wilson, H.D., "Characterization of PULPEX® E–338 Thermally Bonded Absorbent Cores, "Section IV, pp. 1–41, (Sep. 23–24, 1987).

Bither, P.G., "Thermally Bpnded Cores Add Value To Absorbent Products," Nonwovens World, pp. 63–68 (Jan. 1988).

Absorbent Matters, Hercules Incorporated, vol. 2, No. 1, pp. 1–4 (Mar. 1988).

Absorbent Matters, Hercules Incorporated, vol. 2, No. 2, pp. 1–4 (Sep. 1988).

Hanson, J.P., "Roses Have Thorns: Performacne Issues For Thermal–bonding Fibers," Nonwovens World, pp. 71–73 (Sep. 1988).

Nonwovens Management/Specialty Markets Conference, Apostolico, S.C. "Thermal Bonding of Absorbent Cores," Section VIII, pp. 1–13, (Mar. 20–21, 1989).

Textile Fibers/Hoechst Celanese Corporation, CELBOND® Staple Fibers, Product Brochure, (Mar. 1991).

Wilson, H.D., and Engle, E.J., "Fluid Transport In Thermally Bonded Cellulose Pads," In Nonwovens: An Advanced Tutorial, EDS A.F. Turbak and T.L. Vigo, pp. 241–270 (No Date).

Lanigan, W.R., "The Hercules Absorbent Products Laboratory A Tool For The Industry," Section IV, pp. 1–12, (No Date).

"Use Guide For CELBOND® Fibers," Hoechst Celanese, Spartanburg, SC, Jun. 1, 1998, 8 pages.

* cited by examiner

ABSORBENT STRUCTURE INCLUDING A THIN, CALENDERED AIRLAID COMPOSITE AND A PROCESS FOR MAKING THE COMPOSITE

This application is a division of application Ser. No. 09/290,713, filed Apr. 12, 1999, now U.S. Pat. No. 6,368,609, which claims the benefit of Provisional application Ser. No. 60/111,671, filed Dec. 10, 1998.

FIELD OF THE INVENTION

This invention relates to a thin, calendered airlaid composite which may or may not include additional sheet layers to form a multi-layered absorbent structure. The airlaid composite is useful as an absorbent article, (e.g. absorbent pad), particularly in the meat and poultry industry for absorbing exudate in packaging. This invention also includes a process for making such an airlaid composite.

BACKGROUND OF THE INVENTION

This invention relates to airlaid composites and absorbent structures for use as absorbent articles which may be particularly useful in the meat and poultry packaging industry for absorbing exudate. To absorb this exudate, the absorbent pads are generally placed within the package along with the meat or poultry.

Most absorbent pads of the prior art which are used for absorbing exudate from food products consist of absorbent layers which are generally multi-ply layers of tissue, paper toweling and/or wood fluff. The prior art pads tend to have limited absorbency and tend to break up when saturated with exudate. To overcome the tendency to break-up, the prior art pads may be encased (sealed around the peripheral edges) between fluid impervious and fluid pervious layers, which is both costly and difficult to process.

The present invention is distinguished from prior art absorbent pads in that the prior art pads are generally loose, high loft, bulky materials. As a matter of fact, this lofty aspect of many prior art pads is required to achieve absorbency. In the case of absorbent pads formed with tissue or wood fluff, it has been common belief that liquids are absorbed and retained mainly within the empty spaces which are formed in the network of cellulose fibers, rather than absorbed into individual fibers. In such cases, the quantity of liquid absorbed by an absorbent body of cellulose fibers is therefore greater the lower its density, that is, the greater its bulk. Consequently, it has been previously thought that anything which affects the density and can cause the absorbent material to collapse will contribute to a reduction of its absorption capacity. Some pads even include rigid particles to prevent collapse (e.g., nodules, pyramids).

Some prior art pads have attempted to combine binder fibers along with absorbent fibers (e.g. pulp). It should be noted that prior art pads employing binder fibers therein generally have employed such fibers for the purpose of maintaining or establishing high loft in the pad, white providing mechanical integrity to the batt. Additionally, the prior art pads have generally utilized very short binder fibers (having an average length of approximately 1 mm) with the intent that the fibers completely melt and therefore act as a glue which binds the absorbent fibers together. Such pads may have good strength and a capacity for absorbing liquids, but generally will have a fairly low total capacity.

Even with the various embodiments of the prior art pads, most will lose their resilience and the pad will collapse when wetted and subjected to pressure, regardless of the fact that the pulp fibers are interconnected to form a framework. Products such as tissue tend to break apart when wetted. Such materials also readily release their absorbed fluids when placed under a compressive load such as the load of the meat product on the pad and loads such as when packages are stacked one upon the other as in shipping cartons and store displays.

Yet another problem of prior art pads is variability in thickness by as much as +/−15%. Such thickness variation translates into absorbency variation as well. Variable thickness also affects convertibility issues. Since these materials are usually fed through machines with nip rollers or belts, wide variation in thickness results in slippage and jams in the machines which decreases production rates resulting in higher costs.

In the development of such products, an absorbent structure which provides ample absorbency, has uniform thickness and which will not break up during handling or use, is needed.

As for the process of making such absorbent structures, particularly those including binder fibers, typical airlaid materials with binder fibers are mechanically compacted several times during processing to provide strength such that the airlaid material may be handled during processing. Usually, the airlaid material is compressed by a compaction roll immediately after leaving the airformer. The airlaid composite of the present invention is not compacted in any way prior to heating since the airlaid composite must remain in a lofty array so that proper and thorough bonding may occur. Additionally, unlike conventional airlaid processes, the airlaid composite of the present invention is cooled prior to calendering and the calenders are not heated. By cooling the airlaid composite in this way, the structure is not locked down in a compacted state until after the bicomponent fibers have cooled and re-solidified. The thin, calendered airlaid composites of the present invention thus exhibit unexpectedly good absorbency in both capacity to absorb and ability to retain liquid while being presented in a form which is easy to handle and has strength sufficient to avoid the tendency to fall apart.

SUMMARY OF THE INVENTION

The present invention pertains to an airlaid composite which is made of pulp fibers, at least about 2% by weight bicomponent fiber, and moisture. This airlaid composite is unique in that a uniformly even composite is made which upon calendering, becomes a thin structure which maintains significant absorbency when saturated. The bicomponent fibers of the present invention include a first polymer component and a second polymer component, and the first polymer component melts at a temperature lower than the melting temperature of the second polymer component. Mixing of the pulp fibers with the bicomponent fibers is done in such a way that the fibers are evenly dispersed in the airlaid composite. This airlaid composite is then heated such that at least a portion of the first polymer component of the bicomponent fiber is melted, which bond the bicomponent fibers to many of the pulp and bicomponent fibers when cooled. Moisture is added on to the composite to further facilitate bonding when the composite is subsequently subjected to calendering. Optionally, a sheet layer may be attached to the airlaid composite to form a multi-layered absorbent structure. Such composites and absorbent structures are characterized by a drape stiffness of at least about 5 cm, an absorbency of at least about 12 g/g, and a dry tensile strength of at least about 1300 g.

DETAILED DESCRIPTION OF THE INVENTION

Figure 1:
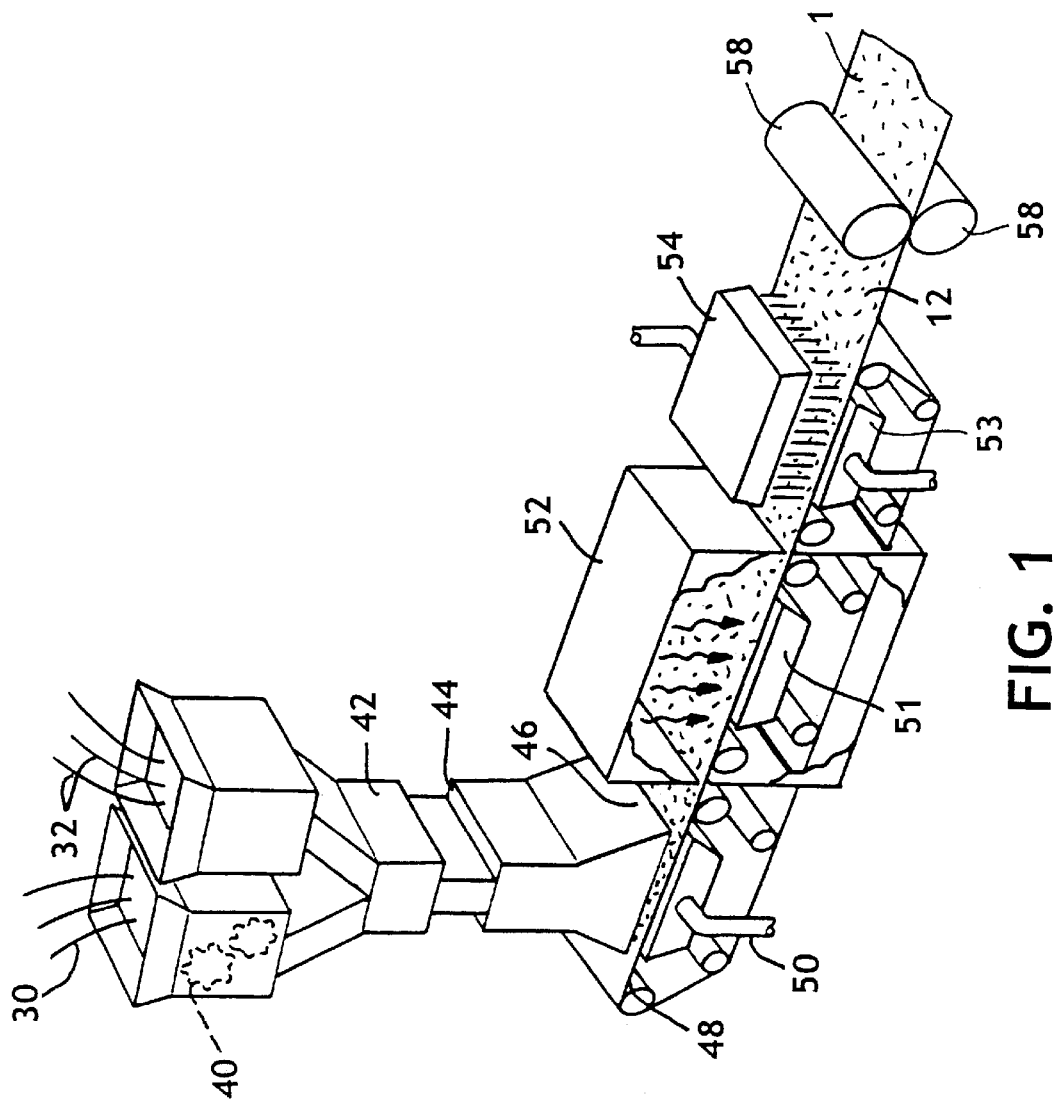
FIG. 1 is a perspective view of an apparatus and process for making the airlaid composite of the present invention.

Airlaid Composite:

The present invention is directed to a thin, calendered airlaid composite, multi-layered structure and absorbent articles formed therefrom. The present invention is a thin, calendered structure which has the advantage of ease of handling due to its thinness, stiffness and strength, while still achieving unexpectedly good absorbency.

As used herein, the term "absorbency" refers to the absorbent capacity of an absorbent material as measured by the "Free-Swell Absorbency Test" which is discussed in more detail below in connection with the examples. The absorbency of the material is measured as absorbed liquid, in grams, over a measured period of time, per gram of absorbent material being tested. The average absorbency of the absorbent structure of the present invention is determined by the average of three (3) or more individual absorbency determinations for a given sample.

The thin, calendered airlaid composite of the present invention is made up of pulp fibers, bicomponent fibers, and moisture add-on, and is formed according to the inventive process which is discussed more fully below. This airlaid composite is characterized by its ability to exhibit unexpectedly good absorbency even though it has been calendered and is unusually thin.

As used herein, the term "pulp fibers" shall mean pulp fibers which are derived from wood and which retain a substantial portion of the lignin present in the unpulped wood but from which enough lignin has been removed such as to make the pulp fibers somewhat hydrophillic. The pulp fibers should have an average fiber length of at least about 2 mm, preferably 2–3 mm, for ease of mixing with the bicomponent fibers. For the airlaid composite of the present invention, it has been found that pulp fiber should be present in the composite in the range of about 70–98% by weight of the composite, preferably 90–98% by weight and most preferably 96–98% by weight. Since the pulp fibers are a major factor for absorbency in the airlaid composite of the present invention, composites having less than 70% pulp fibers would admittedly have high tensile strength (assuming that the balance was made up with bicomponent fibers), but would not have sufficient absorbency because bicomponent fibers are hydrophobic. Likewise, greater than about 98% pulp fiber will result in a structure which will fall apart when saturated. The pulp fibers utilized may or may not be bleached (designated as "B", e.g. BCTMP). Suitable pulp fibers include thermomechanical pulp fibers, chemithermomechanical pulp fibers, chemimechanical pulp fibers, refiner mechanical pulp (RMP) fibers, stone groundwood (SGW) pulp fibers, and peroxide mechanical pulp (PMP) fibers.

Thermomechanical pulp (TMP) fibers are produced by steaming wood chips at elevated temperature and pressure to soften the lignin in the wood chips. Steaming the wood softens the lignin so that fiber separation occurs preferentially in the highly lignified middle lamella between the fibers, facilitating the production of longer, less damaged fibers.

The preferred type of pulp fiber for use in the present invention is chemithermomechanical pulp (CTMP) fiber, also sometimes referred to as chemically-modified thermomechanical pulp fibers. In CTMP processes, wood chips, which may be softwood, hardwood or a blend of softwood and hardwood, preferably softwood, are given a mild chemical treatment in addition to a steaming step prior to mechanical defiberization and are then refined. The chemical treatment is limited so as to minimize lignin removal while increasing the ionic bonding potential of the fibers unlike conventional chemical pulping processing (which removes a major portion of the lignin). This chemical treatment used in CTMP processes has the benefit of obtaining high yield (generally >90%) from the process unlike chemical processes which generally yield 50%. It also has additional benefits of removing some lignin while not going to the extent and cost of full chemical treatment, while minimizing environmental impact since typical chemical processes are not environmentally friendly. CTMP pulp, which may be additionally bleached, is commercially available as "SPHINX FLUFF" from Metsa-Serla Group (Tampere, Finland) and as Standard Grade 550–78 pulp from Millar Western, Ltd. (Edmonton, Alberta, Canada).

A variant of CTMP for which an analogous chemical treatment has been applied is known as chemimechanical pulp, which omits the steaming step practiced in the manufacture of TMP and CTMP. It is also known to chemically treat the pulp after the start or completion of fiberization. Such treatment can be applied to pulp which has not been previously chemically treated, or to pulp which has been previously chemically treated. Other types of pulp fibers may be useful in the present invention as long as the fibers exhibit the combination of wet resiliency and hydrogen bonding as described more fully below. Examples of these additional types include refiner mechanical pulp (RMP), stone groundwood (SGW) pulp, and peroxide mechanical pulp (PMP).

The airlaid composite of the present invention also includes bicomponent fibers. As used herein, the term "bicomponent fibers" refers to fibers which have been formed from at least two thermoplastic polymers which are extruded from separate extruders but spun together to form one fiber and which have a side-by-side arrangement or a sheath/core arrangement. In a sheath/core bicomponent fiber, a first polymer component is surrounded by a second polymer component. The polymers of the bicomponent fibers are arranged in substantially constantly positioned distinct zones across the cross-section of the bicomponent fiber and extend continuously along the length of the fibers. Various combinations of polymers for the bicomponent fiber may be useful in the present invention, but it is important that the first polymer component melt at a temperature lower than the melting temperature of the second polymer component. Melting of the first polymer component of the bicomponent fiber is necessary to allow the bicomponent fibers to form a tacky skeletal structure, which upon cooling, captures and binds many of the pulp fibers. Typically, the polymers of the bicomponent fibers are made up of different thermoplastic materials, such as for example, polyolefin/polyester (sheath/core) bicomponent fibers whereby the polyolefin, e.g. polyethylene sheath, melts at a temperature lower than the core, e.g. polyester.

Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, and styrene-butadiene block copolymers, Kraton such as blind polymers.

In a sheath/core bicomponent fiber, the core can also be made of a thermosetting resin such as phenol-formaldehyde, phenol furfural, urea-formaldehyde, melamine-formaldehyde, silicone rubber, and the like. Particularly preferred in the present invention is a bicomponent fiber known as Celbond Type 255 available from Trevira GmbH & Co of Frankfurt, Germany, which is a polyester core/polyethylene sheath fiber.

The bicomponent fiber will be present in the airlaid composite in at least about 2% by weight of the composite, with the substantial balance being composed of pulp fibers. It has been found that no more than 10% by weight is necessary to achieve adequate bonding and that use of greater than 10% by weight is usually cost prohibitive. Furthermore, the more pulp fiber present in the composite, the greater the absorbency. Airlaid composites having less than about 2% by weight bicomponent fibers did not have adequate wet integrity when saturated with fluid (e.g. polar fluids such as water or water-based solutions such as exudate). Preferably, the airlaid composites will contain about 2 to about 4% by weight bicomponent fibers. As used herein, the term "wet integrity" refers to the composites ability to maintain its structure, even when wet, as more fully discussed in the examples below. In other words, a wet composite of the invention will not fall apart, slough, or otherwise break-up when picked up or handled.

The bicomponent fiber should have a fiber length not to exceed about 1.5 inches (38.1 mm) since fibers which are too long tend to entangle with themselves rather than evenly disperse with the pulp fibers. Preferably the bicomponent fiber length will be in the range of about 0.11 to 0.6 inches (3–15 mm), most preferably about 0.15 to 0.32 inches (4–8 mm), and will have a denier of about 1.5 to 4. Both food grade and non-food grade versions of the bicomponent fiber may be used, depending on the intended use of the composite.

Sufficient moisture addition is also required in the airlaid composite of the present invention to facilitate bonding of the composite upon calendering (as defined below). It is Applicants' theory that such moisture add-on facilitates bonding by creating hydrogen bonds between the pulp fibers upon calendering. Once the moisture has been added and the composite has been calendered to form a thin, calendered airlaid composite, if at least about 5% by weight of the composite is moisture, then sufficient moisture has been added during the process to facilitate bonding. Sufficient moisture add-on during processing has been found to be in the range of about 5 to about 20% by weight of the composite. For example, a sample of the airlaid composite weighing 400 grams/square meter (gsm) with 4 percent by weight bicomponent fiber and 10 percent by weight moisture would contain: 344 gsm pulp+16 gsm bicomponent fiber+40 gsm water.

It should be clear to one of ordinary skill in the art that moisture absorbed, for instance from a humid environment, after formation of the airlaid composite of the present invention is not sufficient moisture to facilitate bonding without subjecting the composite to further calendering. In other words, if the composite absorbs moisture from the atmosphere, the composite would have to be calendered to achieve the benefits of the present invention. The moisture add-on of the present invention must be added prior to calendering in order to facilitate bonding.

As used herein, the term "thin" refers to the thickness to basis weight ratio (wherein the basis weight is that of the pulp and bicomponent fibers only) of the airlaid composite and/or resulting absorbent structure. For purposes of the present invention, a thickness to basis weight ratio of about $3.0 \times 10^{-3}$ mm/1 gsm to $1.0 \times 10^{-3}$ mm/1 gsm has a distinct advantage of improved roll handling. Calendering of the composite also provides an important feature in that it reduces overall the lint associated with such absorbent articles which improves the overall appearance and reduces the tendency to contaminate the meat product with unwanted linty material. Composites of the present invention will instead have a uniformly smooth and even surface. The thickness of these composites does not vary by more than a minor amount over the cross-section of the airlaid composite. For many of these composites there is a relatively uniform basis weight per a given area.

The airlaid composite of the present invention which is both thin and compressed exhibits a drape stiffness of at least about 5 cm, preferably 6–10 cm which is important to facilitate processing on some equipment, such as for instance automated sorting of absorbent pads into meat trays.

Figure 6:
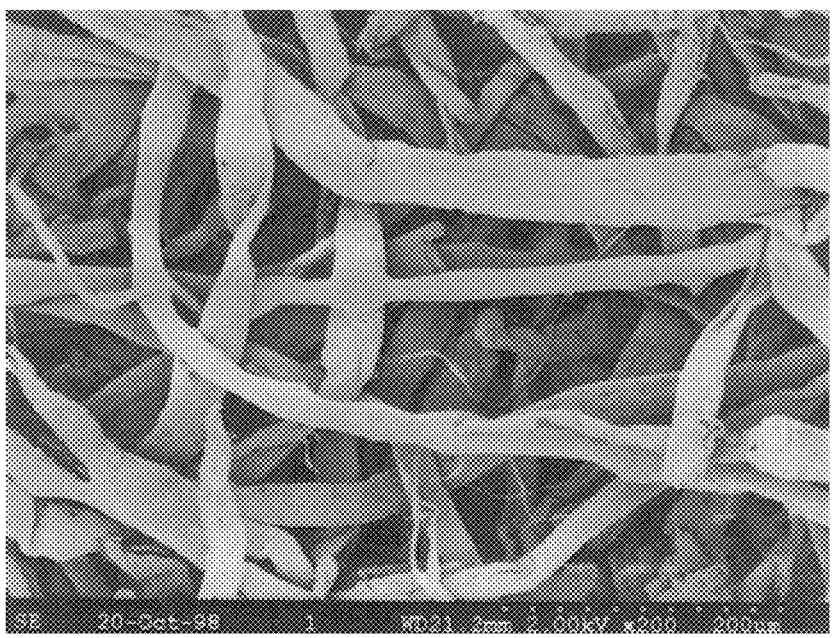
FIG. 6 is a 200× magnification SEM photograph of a calendered (2000 pli) airlaid composite of 466 gsm total weight composed of 400 gsm pulp fiber, 3.4% by weight bicomponent fiber, and 10.7% by weight moisture.
Figure 7:
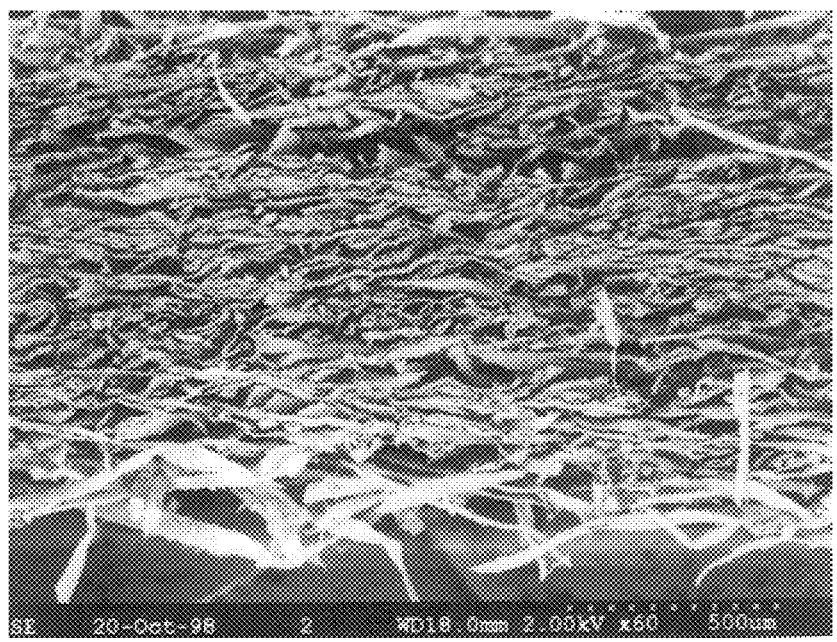
FIG. 7 is a 60× magnification cross-sectional side view SEM photograph of a calendered (2000 pli) airlaid composite of 349 gsm total weight composed of 300 gsm pulp fiber, 3.4% by weight bicomponent fiber, and 10.7% by weight moisture.

The airlaid composite will have a basis weight of 50–500 gsm and is calendered from an initial thickness of approximately 0.50 inches to 0.75 inches (1.27–1.91 cm) and density of about 0.02–0.05 g/cc. As used herein, the term "calendering" means that the airlaid composite has been compressed at a pressure of about 800 to 4000 pounds per linear inch (pli) (143–715 kg/linear cm) preferably 1500–3000 pli (268–536 kg/linear cm), more preferably 2000–3000 pli (358–536 kg/linear cm), to form a thin, calendered airlaid composite having a thickness to basis weight ratio of $3.0 \times 10^{-3}$ mm/1 gsm to $1.0 \times 10^{-3}$ mm/1 gsm, a thickness of 0.025–0.15 cm and a density of 0.5 g/cc or higher. Such calendering is not the same as the compaction and compression usually utilized in the air laying industry. Instead, it is closer to that which is used in the paper industry (known as "super calendering") in that it is conducted at much higher pressures. It is Applicants' theory that such calendering is critical in forming the airlaid composite of the present invention because this creates stored energy in the airlaid composite due to the hydrogen bonding, three-dimensional orientation of the pulp fibers and the resilient nature of the pulp fibers. Subsequent contact with polar fluids (e.g. absorbing water or water-based solutions such as exudate) allows the pulp fibers to separate and return to a more relaxed configuration resulting in an open porous structure suitable for absorbency. FIG. 6 shows a 200× magnification of a SEM photograph of an airlaid composite (466 gsm total weight) having 400 gsm pulp fiber with 3.4% by weight bicomponent fiber and 10.7% by weight moisture, where the airlaid composite has been calendered at 2000 pli. FIG. 7 shows a 60× magnification cross-sectional side view SEM photograph of a calendered (2000 pli) airlaid composite (349 gsm total weight) of 300 gsrn pulp fiber, 3.4% by weight bicomponent fiber, and 10.7% by weight moisture. These figures show a dense absorbent structure having bicomponent fibers bound to many of the pulp fibers such that the thin, calendered structure exhibits unexpectedly good absorbent properties while being in a dense, thin form.

Properties such as absorbency, tensile strength, thinness (thickness to basis weight ratio), regain absorbency, density, stiffness, wet integrity and overall appearance are all important properties for structures of the present invention. When these airlaid composites are made according to this invention, the following benefits are displayed in the airlaid composites. For one, a higher density, therefore reduced thickness, results in overall improvements to roll handling, storage and transportation because more of the airlaid composite can be placed on a roll. When more material is on the roll, production is improved because less down time is needed for roll changing, and less space is needed for storage and transportation. Also, improvements in stiffness along with the tensile strength exhibited by the airlaid composites of the present invention allows for improved processing since there will be less breaks when converting rolls to pads. Probably most importantly, the airlaid composites made according to the present invention have a uniform thickness and absorbency. Airlaid composites of the present invention will exhibit an absorbency of at least about 12 g/g, preferably of at least about 16 g/g. In use, the thin, calendered airlaid composites have the ability to regain 70–90% of the pre-calendered absorbency upon saturation, even under compressive loads such as placement of meat on the pad, which is important to absorbency of the structure. Such a thin, calendered airlaid composite with unexpectedly good absorbency has heretofore been unknown.

Although not required, the airlaid composite may additionally include various combinations of sheet layers attached to one or both sides of the composite. Such sheet layers may be added to the airlaid composite for various reasons including: 1) to provide additional dry surface integrity such as to reduce or cover potential short loose fibers (e.g. lint) that may be present in the airlaid composite, 2) to serve as a separation or barrier layer between the food product and the airlaid composite, and 3) to enhance the appearance of the airlaid composite when it has absorbed exudate since the absorbed exudate is usually unsightly.

Examples of suitable sheet layers include film layers, tissue layers. meltsprayed layers and nonwoven layers. The sheet layer is bonded to the airlaid composite by any suitable method including corona treatment, calendering, adhesive, sonic bonding, or combinations thereof.

A film layer having a thickness of 0.4 to 1 mil, for example, may be used. The film layer may be helpful in holding the multi-layered structure together, particularly when frozen since the pad may be peeled from the meat without tearing the pad. The polymeric film layer may be either liquid pervious or impervious. Additionally, for food packaging applications, the film layer should be compatible with food products. Such films may include polypropylene, high density polyethylene, low density polyethylene, linear low density polyethylene, cellophane, polyvinyl acetate, polyvinyl alcohol, polycaprolactan, polyester, polytetrafluoroethylene, or mixtures or coextrusions of one or more of these materials. Generally preferred polymeric film layers are polyethylene, polypropylene, and polyester, most preferably a polyethylene film layer having a thickness of 0.4 mil.

A preferred method of attaching the sheet layer to the airlaid composite is by corona treatment, followed by the calendering. Corona treatment involves the application of a voltage across the surface of the sheet layer. The resulting treated surface is very reactive and permits the sheet layer to form chemical, as well as mechanical, bonds with the surface of the airlaid composite. This provides firm attachment of the sheet layer to the airlaid composite.

The tissue layer may be a composite of cellulosic fibers having a basis weight of 10–30 lbs./ream (4.5–13.6 kg/ream). The tissue layer may also be a multi-ply layer. Applications wherein the absorbent pad is embedded within a food tray as in U.S. Pat. No. 4,702,377 to Grone would be a particularly useful application for an airlaid composite of the present invention including a tissue layer. The tissue layer would thus provide a non-contacting separation layer between the food and the airlaid composite.

A meltsprayed layer is a fibrous layer or coating of polymer, such as for example a polyolefin polymer, which has been forced through, for instance, a die tip and sprayed onto the surface of the airlaid composite. A coarse meltspray of polyolefin at 1.5 to 10 gsm would be acceptable for use as a sheet layer of the airlaid composite. The meltsprayed layer may be made from polypropylene, polyethylene, polyester, or nylon. Generally, polypropylene is preferred.

The nonwoven layer may also be added to the airlaid composite of the present invention. As used herein the term "nonwoven layer" means a sheet layer having a structure of individual fibers or threads which are interlaid, but not in an identifiable manner as in a knitted fabric. Nonwoven layers have been formed from many processes such as for example, meltblowing processes, spunbonding processes, and bonded carded web processes.

In order to provide an absorbent food pad that will kill or inhibit the growth and spread of food borne pathogens, the airlaid composite may be impregnated with an antimicrobial composition which consists of a water-soluble carboxylic acid and a surfactant as described in commonly assigned U.S. Pat. No. 4,865,855 to Hansen et al. Also, superabsorbents such as carboxymethylcellulose are not necessary for the present invention but may be added if desired. Other materials may be added to the airlaid composite for desired effects, including fluid thickeners and activated carbon granules or fibers, perfumes, optical brighteners, photostability promoters, salts, surfactants, and the like. It will be understood by one of ordinary skill in the art that such additives are useful only in such amounts which would not adversely affect the properties of the airlaid composites of the present invention.

Figure 4:
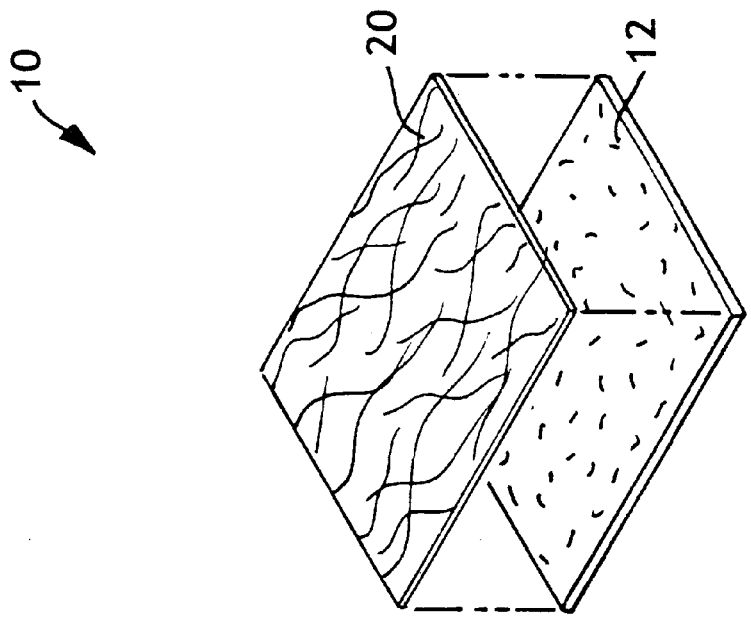
FIG. 4 is a perspective view of the airlaid composite plus one sheet layer, in this case a meltsprayed layer.

For purposes of the present invention, the airlaid composite may be used as an absorbent article, with or without additional sheet layers. Turning to FIG. 4, there is shown a multi-layered absorbent structure 10 embodying the present invention. The multi-layered absorbent structure 10 is rectangular in shape so as to fit conveniently into a food product packaging tray. The multi-layered absorbent structure 10 consists of an airlaid composite 12 attached to a melt-sprayed layer 20.

Figure 3:
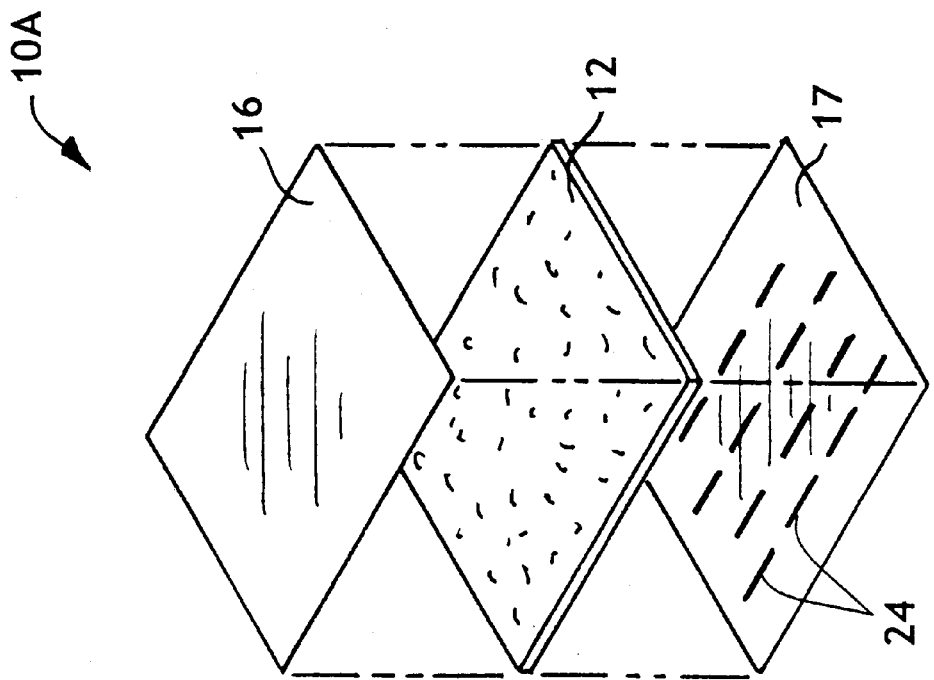
FIG. 3 is a perspective view of the airlaid composite plus two sheet layers, in this case film layers, embodying the features of the present invention.

In FIG. 3, another embodiment shows a multi-layered absorbent structure 10A having three layers: a fluid impervious polymeric film layer 16, an airlaid composite 12, and a fluid pervious film layer 17. The fluid pervious layer 17 is shown here with rows of slits 24 sufficient to pass fluids having a viscosity as high as 24 centipoise under gravity flow over a period of 24 (twenty-four) hours (e.g. chicken exudate or blood). Likewise, fluid pervious layer 17 may be perforated with holes. The holes or slits in the fluid pervious layer 17 allow exudate which has drained off of the meat to be absorbed by wicking action through the fluid pervious layer 17 into the airlaid composite 12. As shown, it is not necessary to encase (seal around the peripheral edges) the film layers since attachment has been achieved as described above, Furthermore, by not sealing the peripheral edges, a further conduit for fluid absorption remains by leaving the airlaid composite 12 exposed around the edges.

In use, the multi-layered absorbent structure 10A of FIG. 3 is placed between the food product and the tray or other packaging material, with the film layers 16 or 17 in contact with the food product. As the juices or liquids are released from the food product, they additionally drain to the edge of the multi-layered absorbent structure and are absorbed by the underlying airlaid composite 12. Unlike previously known absorbent pads, the thin, calendered airlaid composite has sufficient ability to recover thickness, even under compressive load, as for example the weight of the meat product, by wicking evenly to absorb the exudate. Further, the airlaid composite 12 is less likely to release its fluids under such loads.

Process for making the Airlaid Composite:

Preparation of the airlaid composite begins with the fiberization of the pulp. Fiberization is the process of breaking up rolled or baled pulp into fine pulp fibers. Since pulp is purchased in either rolled or baled form and the pulp is thus in a dense, hard form, fiberization is required to get the pulp in a usable form. There are many known methods for fiberizing pulp. See, for example, U.S. Pat. No. 3,825,194 to Buell, U.S. Pat. No. 4,100,324 to Anderson and U.S. Pat. No. 3,793,678 to Appel.

Once the pulp is fiberized, it is ready to be blended with the bicomponent fibers. Blending of the fibers begins with metering the pulp fibers and bicomponent fibers at the desired weight ratio into a mixer. As will be generally understood by one of ordinary skill in the art, metering may be variable by as much as ±1–2% by weight of each component due to machine capability. Various methods for metering the fibers are known including using a screw auger, pocket chamber or by drop feeding. The pulp fibers and bicomponent fibers are then integrally mixed in a mixing step, which is important because good dispersion of the bicomponent fibers in the pulp fibers is necessary to effect the bonding which will be discussed in more detail below. Methods of mixing include blending in an airstream or other mechanical mixing device (e.g. an attrition mill) and the like.

The integrally mixed pulp fibers and bicomponent fibers are then formed into an airlaid composite by conveying the fibers by air through a forming head or nozzle and feeding the fibers continuously onto an endless forming surface, such as a wire screen. A vacuum means may also be included for drawing the fibers against the screen. Unlike most airlaying processes and unique to this process, compressing or compacting of the thus formed airlaid composite is not required, as will be illustrated in the examples below.

As used in the prior art, compaction utilized a set of rollers above and below the airlaid material to compact it in order to increase its self-adherence and thereby its mechanical integrity for further processing. Compaction rolls performed this function well but were considered to have a number of drawbacks including a decrease in bulk or loft in the final product which was considered undesirable.

It is important for the present invention that the airlaid composite remain in its lofty array until the composite has been subjected to a heating and cooling means so that proper and thorough bonding between many of the pulp fibers and bicomponent fibers and/or between bicomponent fibers may occur while still in that lofty array. The airlaid composite does not, therefore, have high mechanical integrity at this point of the process. It is also important to note that wet laying processes would not work in the present invention because it would not be possible to achieve the lofty array required for bonding if the composite were wet-laid prior to the bonding step.

The airlaid composite may be formed in continuous sheet as describe above or alternately, individual pads or pledgets may be formed on equipment such as, for example, a drum former. A drum former has discontinuous pockets in the circumferential surface, each pocket having a permeable surface at the bottom of the pocket. A vacuum is drawn on the interior of the drum through the permeable surface, thereby allowing air flow into the pocket causing the pulp fibers, bicomponent fibers, and any granular or powder products entrained in the air to lodge in the pocket. The remaining circumferential surface of the drum is impermeable to air so that the fibers do not form on this flat surface. As the drum rotates, the vacuum is blocked and the fibrous material trapped in the pocket is transferred by means of vacuum, pressure, and/or mechanical means to a forming surface, resulting in placement of individual pledgets on the forming surface which are discretely spaced apart from one another. These pledgets may be subsequently carried through the remainder of the process by a carrier sheet layer such as pulp tissue or nonwoven layer. Alternately, the individual pledgets may be transferred through the process by a series of vacuum belts and mechanical means.

In one embodiment of the present invention, a roll of a sheet layer such as tissue or a nonwoven may be unwound and conveyed on the forming surface and the pulp/bicomponent fiber mixture air laid onto the surface of the sheet layer. A sheet layer of film would not be suitable at this stage since the airlaid composite will be conveyed through a heating means where the film layer would block the flow of heated air through the structure, (and which may melt the film), and also because the vacuum necessary to hold down the airlaid fibers could not be transmitted through the film layer. For that matter, it is important that any sheet layer attached at this stage must be able to withstand the heating means without adversely affecting its properties.

Figure 5:
FIG. 5 is a 200× magnification scanning electron microscope (SEM) photograph of an uncalendered airlaid composite of 520 gsm total weight composed of 455 gsm pulp fiber, 8.7% by weight bicomponent fiber, and 4% by weight moisture wherein the bicomponent fiber has been melted to bind the pulp fibers.
Figure 8:
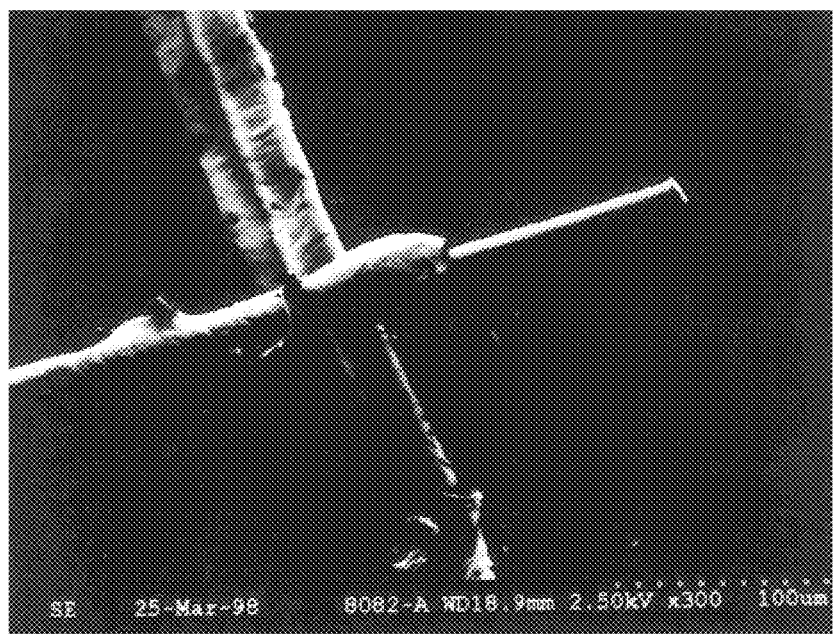
FIG. 8 is a 300× magnification SEM photograph of an uncalendered airlaid composite of 520 gsm total weight composed of 481 gsm pulp fiber, 3.6% by weight bicomponent fiber, and 3.8% by weight moisture wherein the bicomponent fiber has been melted to bind the pulp fiber.

The airlaid composite is then subjected to a bonding step in which the composite passes through a heating means to activate the bicomponent fibers to bond the airlaid composite (e.g. to melt the sheath of a sheath/core bicomponent fiber). Heating allows the bicomponent fibers to form a tacky skeletal structure, which upon cooling, captures and binds many of the pulp fibers, which is shown more clearly in FIGS. 5 and 8. FIG. 8 is a 300× magnification SEM photograph of an uncalendered airlaid composite (total weight of 520 gsm) including 500 gsm of pulp fiber which has been fiberized from pulp with 3.8% by weight bicomponent fiber and 3.6% by weight moisture wherein the sheath of the bicomponent fiber has been melted to bind the fibers together. In this figure, the melted sheath of polyethylene has clearly melted away from the polyester core and is bonded to the pulp fiber. This figure also shows the additional advantage of the sheath/core bicomponent fiber in that the core does not curl or otherwise crimp, but instead maintains a columner configuration which provides additional strength to the composite. FIG. 5 is a 200× magnification SEM photograph of an uncalendered airlaid composite. In this figure, the composite (total weight of 520 gsm) included 500 gsm of fiberized pulp, 8.7% by weight bicomponent fiber, and 4% by weight moisture wherein the bicomponent fiber has been melted to bind the pulp fibers. The fibers which appear to have a rough texture and small holes are the pulp fibers while the fibers having a smoother surface are the bicomponent fibers. Discrete bond points can be seen where indicated by the arrows.

Heating of the airlaid composite may be achieved for example, by dry heat, as by passing hot air through the composite or by heating it in an electric oven. It is important that the heating conditions are controlled at a temperature and air flow rate sufficient to melt only the first polymer component of the bicomponent fiber, while not melting the second polymer component (e.g., melt the sheath and not the core). As will be understood by one of ordinary skill in the art, proper temperatures and air flow rates are dependent on the type of polymers used in the bicomponent fibers. Of course, the proper heating condition will also be a function of the heating rate of the air flow. As the air flow rate is increased, a lower temperature may be utilized, while decreased flow rate will require an increased temperature to achieve melting within the same time interval. Whatever the conditions used, it is important that the air flow rate not be set at a rate which will result in compression of the airlaid composite as uniform melting will not occur. It will also be understood that the heating may be achieved by other means such as exposing the airlaid composite to radiation, for example, infrared radiation of a suitable intensity and duration.

It will be understood by one of ordinary skill in the art that subjecting the airlaid composite to such a heating means will remove any surface moisture that may have been present in the composite up to that point. It is a requirement of the present invention that the airlaid composite be then re-moisturized. The moisturizing and heating step may occur simultaneously if for instance moist heat is used such as by the use of moist hot air or superheated steam, as long as adequate amounts (as described above) of moisture are imparted thereby and sufficient temperatures are reached to melt the sheath of the bicomponent fiber. Likewise, these steps may be independent steps. In that case, one such method of moisturizing the airlaid composite may be by exposing the composite to a spray of atomized water. Whatever the method utilized, it is important that the moisture be distributed evenly through the airlaid composite. Thus, for example, a vacuum box may be positioned below the airlaid composite to draw the moisture through the composite, thereby improving distribution of the moisture in the z-direction (thickness direction) of the airlaid composite.

Alternatively, a humidity chamber or high pressure steam may be used to add moisture to the airlaid composite. Typical settings of the humidity chamber may be set at for instance 90 percent relative humidity and 70° F. Both the humidity chamber and the high pressure steam methods would most likely not require a vacuum, while the application of moisture using a spray atomizer, would most likely require a vacuum.

Once the airlaid composite has been heated, it must be cooled prior to calendering to re-solidify the bicomponent fibers, thus binding the bicomporient fibers to the pulp fibers and/or binding the bicomponent fibers together. If the moisturizing step occurs simultaneously with the heating step, a separate cooling is advantageous. If, on the other hand, the moisturizing and heating steps are independent steps, cooling can also be effected during the moisturizing step by varying the temperature of the moisture applied to the airlaid composite. Furthermore, an independent cooling step which occurs between the heating and moisturizing steps may be useful. For purposes of the present invention, it has been found that sufficient cooling occurs when the moisture is applied at ambient temperature. Other means of cooling will be known by those of ordinary skill in the art.

After forming the airlaid composite, a sheet layer may be attached to one or both sides of the composite whether or not a sheet layer has been attached earlier in the process. One such sheet layer may be formed by means of spraying a layer of meltblown polymer onto the surface of the airlaid composite, either before or after the moisturizing means. The sheet layers may also be attached by unwinding a previously made sheet layer and attaching to either side of the composite. The sheet layers will preferably be corona treated prior to attachment to the composite which will facilitate adequate adhesion such that the thus formed multi-layered structure will riot easily delaminate. Further adhesion will occur through calendering as discussed in more detail below. Examples of the multi-layered structures include, but are not limited to: film/composite; film/composite/film; film/composite/meltblown; nonwoven/composite/meltblown; tissue/composite/film; tissue/composite/tissue; and tissue/composite/meltblown. The film layer may be either fluid pervious or impervious as necessary to attain the desired properties in the final structure.

The airlaid composite, including additional sheet layers if present, will then be calendered as defined above. Such calendering may occur, for instance, using preferably two steel rolls or a series of rolls in such a spatial relationship and pressure as to calender the airlaid composite or the multi-layered structure therebetween. Other examples of roll combinations also include a steel roll and a rubber (or rubber-coated) roll; and a steel roll and a paper coated roll. Alternatively, a press could also be used to calender the composite, requiring that the material or press be indexed and stopped on the wire and then pressed. Such an arrangement could also incorporate cutting of the composites into pads, thereby combining the calendering and cutting in one step. The calendered airlaid composite gains dry tensile strength and a reduction in bulk (thickness) from the calendering. It is important that calendering be conducted at ambient or only slightly elevated temperatures (e.g. the rolls are not generally heated) because higher temperatures would damage the airlaid composite.

The thin, calendered airlaid composite or multi-layered absorbent structure thus formed has a strength sufficient such that it may be rolled up or handled in sheet form for storage, transportation or unwinding purposes, and sufficient to prevent sloughing or otherwise breaking up when saturated. Tensile strength, (both wet and dry), has been measured for the airlaid composites of the present invention as discussed more fully below in the examples. It has been found that these composites exhibit machine direction (MD) dry tensile strength in the range of about 1500–10,500 grams and cross machine direction (CD) dry tensile strength in the range of about 1300–6900 grams.

FIG. 1 illustrates diagrammatically a form of apparatus suitable for forming the airlaid composite 12 of the present invention. Pulp fibers 30 are fiberized in a fiberizer 40 and metering means 42 combine the set amounts of pulp fibers 30 with bicomponent fibers 32. Pulp fibers 30 and bicomponent fibers 32 are then integrally mixed in a mixer 44. A separate mixing step will not always be required. For instance, when the density of the pulp fiber is about 1 g/cc and the density of the bicomponent fiber is about 0.9 g/cc, the two fibers will readily mix together in the turbulent air flow which is typical in an airlaying process. The fibers are thus formed into an airlaid composite 12 by conveying the fibers by air through a forming head 46 and feeding the fibers continuously onto an endless forming surface 48, while sufficient vacuum means 50 secure the composite without decreasing its lofty state. The airlaid composite 12 is then conveyed through a heater 52 which may also utilize heater vacuum means 51 to secure the composite and to draw off the hot air. The heater 52 melts the first polymer component of the bicomponent fibers 32 without melting the second polymer component. As shown, the airlaid composite 12 is then conveyed through a moisturizer 54, which may also utilize moisturizer vacuum means 53, whereby the moisturizer 54 both cools the composite causing the bicomponent fibers 32 to bind the pulp fibers 30, and adds moisture to the composite. The thus formed airlaid composite 12 is then compressed using a calendering means 58 to form a thin, calendered airlaid composite 1.

Figure 2:
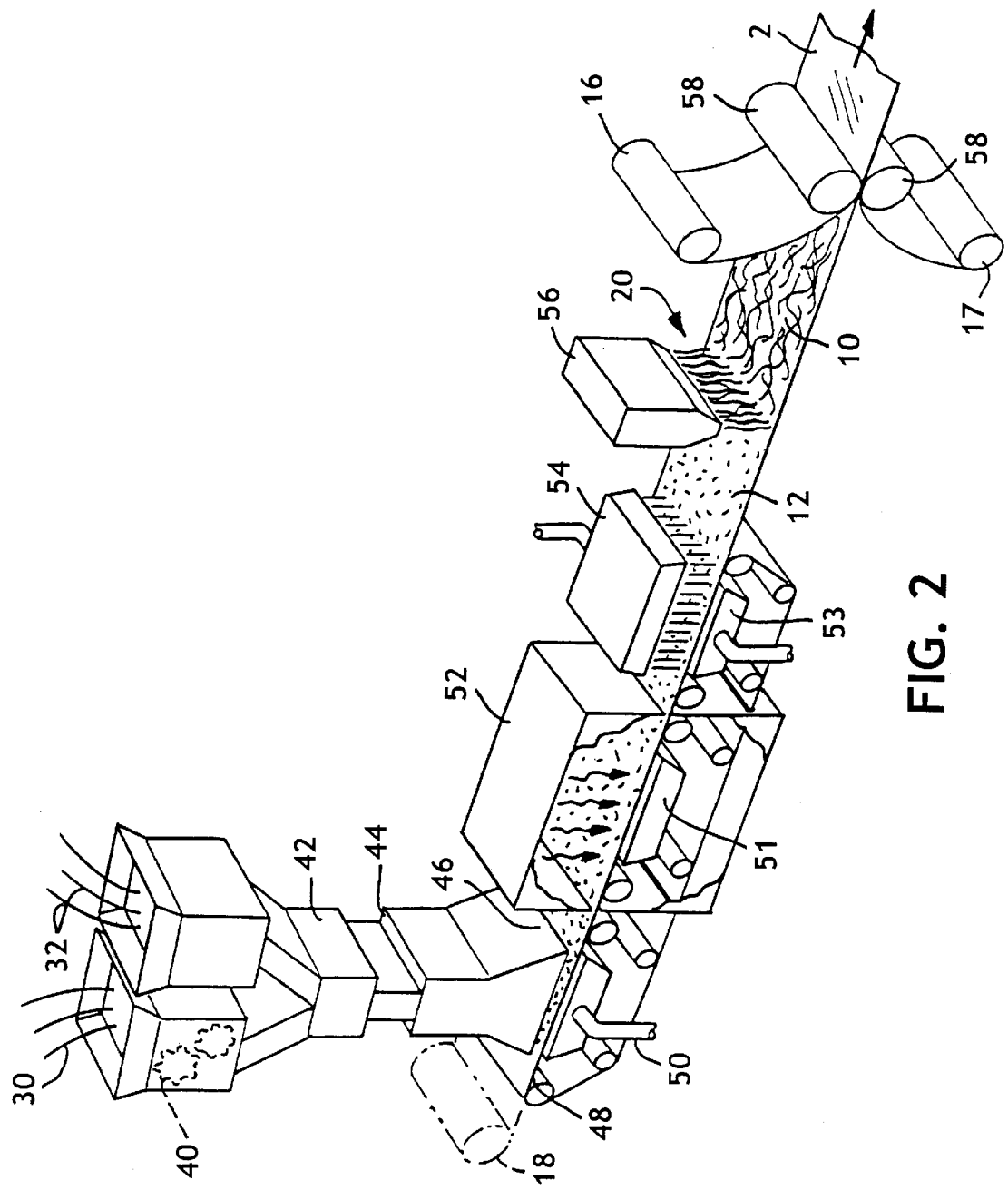
FIG. 2 is a perspective view of an apparatus and process for making the multi-layered absorbent structure of the present invention.

FIG. 2 illustrates diagrammatically a form of apparatus suitable for forming the multi-layered absorbent structure 10 of the present invention, which is essentially the same as that described in FIG. 1 above with the exception that additional sheet layers may be added to the airlaid composite 12. As discussed above, a sheet layer such as a tissue layer 18 may optionally be added to the forming surface 48 such that the airlaid composite 12 is formed directly on the tissue layer 18. Also, various layers may be added to one or both sides of the composite by such means as for instance blowing a meltsprayed layer 20 directly onto the airlaid composite 12 using a meltspraying means 56, or by unwinding sheet layers such as fluid impervious film layer 16 and fluid pervious film layer 17. The airlaid composite with additional sheet layers is then calendered to form a thin, calendered multi-layered absorbent structure 2.

The composite or multi-layered absorbent structure may then be cut into various shapes depending on the ultimate application. Such composites and structures will be particularly useful in applications where high absorbency and exceptional thinness would be an asset. Examples of such absorbent applications include, but are not limited to, absorbent pads in meat and poultry packaging, in other food packaging where the food product tends to sweat or give off fluid (e.g. salad packs), in shipping envelopes or packages where the products shipped have a potential for fluid loss and/or accumulation (e.g. blood/medical applications), in personal care products and the like.

Alternate uses for airlaid composite of the present invention include gaskets, dams, or dikes that can be made to seal the boundary or edge of a product when liquid comes into contact with such an edge. The material expands upon contact with liquids such as water and may expand up to several times the original compressed thickness. This action, when in a direction perpendicular to the fluid flow, and in a constrained environment, will act as a seal, slowing or preventing further insults of liquid from passing through this area. This aspect of the present invention may be of particular use in a leg cuff or waist band of disposable absorbent garments such as baby diapers or incontinent garments. The sealing action acts as a dam to prevent fluids from passing the leg or waist opening and provide additional time for the absorbent core of the garment to wick the fluids away from the openings.

The following examples illustrate the preparation of the airlaid composite and multi-layered absorbent structures in accordance with the present invention.

EXAMPLES

Samples of the present invention and comparative examples were prepared as described below. The samples were then subjected to the following tests. When additional web layers were added to the airlaid composite to form a multi-layered absorbent structure, such layers are noted.

Weight of the Composite:

The weight of the samples used for the examples below was determined by cutting a piece of the airlaid composite and weighing it on a conventional scale. The weight was recorded in grams. The basis weight was determined by dividing the weight by the area of the cut sample.

Thickness:

Thickness was measured using a hand held, manually raised, Starrett bulk tester having an anvil of 2.75 inches (7 cm) diameter, a weight of 80 g and was recorded in inches.

Density:

Density of the calendered airlaid composite is calculated by dividing the weight of the composite sample by the volume of the sample and is recorded in g/cc.

Wet Integrity:

As described above, a sample which has been saturated with fluid (e.g. water or exudate) is considered to have wet integrity if it does not fall apart, slough, or otherwise break-up when picked up or handled. The examples below indicate that the sample either had wet integrity or it did not.

Drape Stiffness:

The "Drape Stiffness" test measures the drape stiffness or resistance to bending of the composite. The bending length is a measure of the interaction between the composite weight and stiffness as shown by the way in which the composite bends under its own weight, in other words, by employing the principle of cantilever bending of the composite under its own weight. In general, the sample was slid at 4.75 inches per minute (12 cm/min), in a direction parallel to its long dimension, so that its leading edge projected from the edge of a horizontal surface. The length of the overhang was measured when the tip of the sample was depressed under its own weight to the point where the line joining the tip to the edge of the platform made a 41.50 angle with the horizontal. The longer the overhang, the slower the sample was to bend; thus, higher numbers indicate stiffer composites. This method conforms to specifications of ASTM Standard Test D 1388.

The test samples were prepared as follows. Samples were cut into rectangular strips measuring 1 inch (2.54 cm) wide and 6 inches (15.24 cm) long, unless otherwise noted. Three specimens in each of the machine (MD) and cross-machine (CD) directions of each sample were tested. A suitable Drape-Flex Stiffness Tester, such as FRL-Cantilever Bending Tester, Model 79–10 available from Testing Machines Inc., located in Amityville, N.Y., was used to perform the test.

The drape stiffness, measured in inches, is one-half of the length of the overhang of the specimen when it reaches the 41.5° slope. The drape stiffness reported below of the sample was the arithmetic average of the results obtained from the samples tested in each of the machine and cross-machine directions, reported separately. The drape stiffness of the sample was reported to the nearest 0.01 inch (0.254 mm).

Free-swell Absorbency:

The Free-Swell Absorbency Test is a test designed to measure absorbency—the ability of the absorbent material to absorb and hold a liquid and was designed to mimic the absorbent material in use, e.g. as an absorbent pad to absorb exudate in a poultry tray package. The absorbent capacity was reported as the weight of liquid absorbed over a measured period of time, expressed in grams of liquid per grams of absorbent material. This Free-Swell Absorbency Test was conducted as follows. The test procedure for absorbency was one in which each sample (sized as noted below in the Examples) was taped, using double-sided tape, to a poultry tray (e.g. "3P"), which was 6.5 inches (16.51 cm) wide, 8.75 inches (22.23 cm) long, and 1.25 inches (3.175 cm) deep. The tray was then filled with liquid (500 mL), thereby submerging the sample in the liquid. The sample was left to absorb the liquid for a certain amount of time (soak time), which was generally 24 hours unless otherwise noted. The tray with the sample was then drained (by tilting the tray to drain the liquid out) for a certain amount of time (drain time), which was generally 1 minute unless otherwise noted, and any excess water was wiped off of the tray. The absorbent capacity was determined as follows:

Absorbent Capacity (g)=wet weight of the tray and sample–dry weight of the tray and sample The liquid absorbed by the sample was then used to calculate the sarnple's absorbency according to the following equation:

Absorbency (g/g)=Absorbent Capacity (g)/[(weight of the sample–weight of the film)×(percentage of pulp fiber in the sample)]

Regain Absorbency:

The sample's ability to regain absorbency after the sample has been calendered and then saturated was measured. This regain absorbency is the same as described above for Free Swell Absorbency except that the absorbency of the saturated sample was measured both before the sample had been calendered and after calendering. The regain absorbency is expressed as the percentage of absorbency of the calendered composite based on the absorbency of the same composite before calendering and indicates the significance of calendering.

Regain Absorbency (%)=[Absorbency of calendered composite (g/g)/Absorbency of uncalendered composite (g/g)]*100

Tensile Strength:

The cut strip test method measures tensile (breaking) strength of the composites when subjected to a continually increasing load in a single direction at a constant rate of extension. The method used conforms to ASTM Standard Test D 5034-95, as well as Federal Test Methods Standard No. 191A Method 510:2-78, with the following exceptions: 2×6 inch (5.08×15.24 cm) sample size, 10 lb. (4.56 kg) load cell, 25 cm/min. crosshead speed (a constant rate of extension), and a gauge length of 4 inches (10.16cm). Results were expressed in units of weight (to break).

Samples were tested in both the CD and MD and results expressed in grams to break. Higher numbers indicate a stronger structure. The specimen was tested, for example, on an 1130 Instron, available from the Instron Corporation, or a Thwing-Albert Model INTELLECT II available from the Thwing-Albert Instrument Co., 10960 Dutton Rd., Philadelphia, Pa. 19154. Additionally, unless otherwise noted, the samples were tested under dry conditions, which includes only the moisture add-on which was necessary to form the airlaid composite. Where noted, some samples were also tested under wet conditions, which added fluid or exudate to the sample to test strength performance under conditions which more closely resemble actual use. In such cases, 10 mL of fluid was applied and tested instantaneously to the center of the sample prior to subjecting it to the test as described above.

Examples 1—1 to 1–3

Various airlaid composite samples were made according to the following process. Using Example 1—1 to describe the process, in Example 1—1, the pulp fiber (in this case BCTMP) was provided as "SPHINX FLUFF" available from Metsa-Serla Group (Tampere, Finland) and was fiberized into a usable fiber form. The pulp fibers were combined with 5.4% by weight bicomponent fibers known as Celbond Type 255, non-food grade, undyed fibers which are polyester core/polyethylene sheath bicomponent fibers, with a length of 6 mm and a denier of 3, available from Trevira GmbH & Co of Frankfurt, Germany, the polyester business of Hoechst, and conveyed via an air stream to a mixing point where it was blended with and integrally mixed with bicomponent fibers according to the conventional airlaying process described generally in U.S. Pat. No. 4,640,810 to Laursen et al., assigned to Scan Web of North America, Inc. An airlaid composite of 400 gsm pulp fiber and 26 gsm bicomponent fiber which was 0.75 inches (1.90 cm) thick was thus formed.

There was no compression of the airlaid composite by a compaction roll or compression roll before heating or cooling of the composite.

The bicomponent fibers were then melted by conveying the un-compacted airlaid composite through a conventional forced air bonding oven at a temperature of 335° F. (168.3° C.), thereby melting the polyethylene sheath. (The desired melting temperature of this particular bicomponent fiber is in the range of 270 to 335° F. (132.2–168.3° C.)). Upon leaving the oven, the airlaid composite was cooled by moisture addition. Cooling solidified the polyethylene sheath, thereby bonding the bicomponent fibers to many of the pulp fibers and binding many of the bicomponent fibers together.

The additional cooling and moisturizing was conducted using a spray atomizer which added a quantity of water as noted in the table below at a rate of 1019 gallons/min. (3857.3 l/min) to the airlaid composite. A vacuum box under the forming wiire applied a vacuum of 1.08 psi (7472 Pa) to draw the water evenly through the airlaid composite. The composite was then wound onto a roll 30 inches (76.2 cm) wide as it was being cut into narrower widths of about 9 inches (22.9 cm). The rolled composite was then placed in an airtight bag to maintain the moisture content for a period sufficient for uniform moisture distribution throughout the composite.

The moisturized airlaid composite was then removed from the bag and unwound for calendering. A sheet layer of 0.4 mil fluid impervious polyethylene film (available as SF 181 from Huntsman Corporation of Salt Lake City, Utah) was unwound with the airlaid composite and calendered together at a pressure of 2000 pli (357.2 kg/linear cm). Five repetitions of the thus formed thin, calendered multi-layered absorbent structure were tested as described above and had properties as shown below in Table 1.

Table 1 also includes data for Examples 1–2 and 1–3, which were made as described above except that these had 6.9% and 8.7% respectively of the bicomponent fibers. The absorbency was tested as described above using a sample size of 4×6 inches (10.16×15.24 cm), a soak time of 24 hours and a drain time of 1 minute.

TABLE 1

| EXAMPLE NO. | MULTI-LAYERED ABSORBENT STRUCTURE (gsm) | BICOMPONENT FIBER (wt. % of composite) | MOISTURE (wt. % of composite) | ABSORBENCY (g/g) | STANDARD DEVIATION (g/g) |
|---|---|---|---|---|---|
| 1-1 | 493 | 5.3% | 11.4% | 19.43 | 0.20 |
| 1-2 | 379 | 6.9% | 11.4% | 19.60 | 0.57 |
| 1-3 | 299 | 8.7% | 10.7% | 17.32 | 0.28 |

Comparative Examples 1—1 to 1–3

Three repetitions of various airlaid composite samples were created as described above in Example 1, this time using softwood Kraft pulp fibers instead of the BCTMP fibers and moisturizing using a humidity chamber rather than a spray atomizer. The composites were placed in the humidity chamber set at 70° F. (21.1° C.) and 70% relative humidity for at least 2 hours. The Kraft pulp is a pulp which has been chemically processed in an effort to remove a major portion of the lignin from the pulp. "Sulfate or Kraft pulp" is that which has been cooked with strong NaOH plus $Na_2S$ to substantially remove the lignin. Average values of various weighted samples with varying amounts of bicomponent fiber are shown below in Table 2. The airlaid composite made according to the present invention, (Examples 1—1 to 1–3 above), exhibited absorbencies which were 6.7 to 10.2 gram/gram greater than the absorbencies of the Comparative Examples C1—1 through C1–3. Further, the Kraft pulp airlaid composite made according to the process of the present invention had no spring-back; it would not regain its bulk or thickness, thereby affecting its ability to absorb. The ability to regain bulk or thickness when saturated is exhibited only by the airlaid composite of the present invention and is the reason for the improvement in absorbency of this composite. Once it gets wet, it expands, thereby regaining its thickness to spring-back and absorb the liquid.

Comparative Example 2

An airlaid composite sample was made as described above in Example 1 except that the airlaid composite was compacted directly after forming the composite on the forming wire as is done in a conventional airlaying process, and further that the calendering pressure was 3700 pli (660 kg/linear cm). The airlaid composite was made from the BCTMP pulp fiber and a bicomponen-fiber of a polyethylene sheath and a polypropylene core known as Chisso HR6 bicomponent fiber available from Chisso Corporation of Osaka, Japan. The bicomponent fiber having a length of 1.5 inches (3.81 cm) and a denier of 3, was difficult to open in the process, (e.g. separating the compressed masses of fibers into loose tufts), because of the fiber length—the bicomponent fiber entangled with itself because the length was too long. The absorbency was tested for a 1 minute soak time and a 3 second drain time for a 4×7 inch (10.16×17.78 cm) sample size. The absorbency was measured at 12.23 g/g.

Comparative Example 3 and 4

Figure 9:
FIG. 9 is a 200× magnification SEM photograph of an uncalendered airlaid composite of 520 gsm total weight composed of 455 gsm pulp fiber, 8.7% by weight polyethylene/polypropylene blended biconstituent binder fiber, and 4% by weight moisture wherein the binder fiber has been melted but does not bind the pulp fibers.

An airlaid composite sample was made as described above in Comparative Example 2, except that the composite was additionally compressed at a pressure of about 200 pli (35.7 kg/linear cm) directly after heating in the oven, (such that the airlaid composite was not cooled prior to this compression), no film was added, and no calendering (3700 pli) was performed. The BCTMP pulp fiber was used to make up the composite but this time using for Comparative Example 3 the Trevira Bicomponent Fiber and for Comparative Example 4 a polyolefin fiber known as T-410 2.2 denier per filament (dpf) Polyethylene Fiber, available from Hercules Incorporated of Wilmington, DE, which is not a bicomponent fiber, but is a biconstituent blend of 85/15 polyethylene/polypropylene, with a denier of 3. The polyolefin fiber is a fiber formed from two polymers and extruded from the same extruder as a blend into a monofiber. This sample did not have the wet integrity when prepared as an airlaid composite according to the present invention because the polyolefin fibers tended to melt together rather than melt and bind with the pulp fibers as can be seen in FIG. 9. FIG. 9 is a 200× magnification SEM photograph of an uncalendered airlaid composite of 520 gsm total weight composed of 500 gsm pulp fiber, 8.7% by weight of the

TABLE 2

| EXAMPLE NO. | AIRLAID COMPOSITE WEIGHT (gsm) | BICOMPONENT FIBER (wt. % of composite) | MOISTURE (wt. % of composite) | ABSORBENCY (g/g) | STANDARD DEVIATION (g/g) |
|---|---|---|---|---|---|
| C1-1 | 488 | 5.3% | 10.5% | 9.20 | 0.86 |
| C1-2 | 376 | 6.9% | 10.4% | 10.07 | 0.89 |
| C1-3 | 298 | 8.7% | 10.4% | 10.63 | 0.80 | polyethylene/polypropylene blended biconstituent fiber, and 4% by weight moisture. Even at higher melting temperatures, the biconstituent fibers will tend to melt into a glob rather than melt and bind with the pulp fibers. The tensile strength was tested for two repetitions as shown below in Tables 3 and 4, which was the first indication that the bicomponent fiber provides significantly improved tensile strength to the airlaid composite over the biconstituent fiber.

moisture was added-on using a hand held spray mister and the composite was calendered at a pressure of 2000 pli with various moisture add-on percentages, as shown below in Table 6. Samples were prepared having an area of 20.25 square inches (130.64 cm$^2$). Of the resulting materials, the material calendered with moisture between 11.2 percent and 18.1 percent achieved the desired balance of properties of weight, thickness and density, while also having a uniform, non-linty appearance.

TABLE 3

| EXAMPLE NO. | BASIS WEIGHT (gsm) | BICOMPONENT FIBER (wt. % of composite) | MOISTURE (wt. % of composite) | MD TENSILE STRENGTH (g/50 mm) |
|---|---|---|---|---|
| C3-1 | 520 | 7.1% | 4% | 2760 |
| C3-2 | 520 | 8.7% | 4% | 3897 |

TABLE 4

| EXAMPLE NO. | BASIS WEIGHT (gsm) | BICOMPONENT FIBER (wt. % of composite) | MOISTURE (wt. % of composite) | MD TENSILE STRENGTH (g/50 mm) |
|---|---|---|---|---|
| C4-1 | 520 | 7.1% | 4% | 963 |
| C4-2 | 520 | 8.7% | 4% | 1048 |

Example 2 and Comparative Example 5

The following data show that the absorbency of the airlaid composite is increased when the compression/compaction is eliminated from the "conventional" airlaying process. Both Examples were made using the Trevira bicomponent fiber and Example 2 was made as described above for Example 1 in that the airlaid composite was not compacted after forming. Comparative Example 5 was made as described above for Example 1 except that there was a compaction roll used to compact the airlaid composite directly after it was formed. Absorbency was tested and reported below in Table 5 along with the standard deviation. Example 2 represents the average of 5 repetitions, while Comparative Example 5 represents the average of 20 repetitions. An increase of 3.84 gram/gram (24.4% increase) in absorbency was found when the compaction roll was eliminated.

TABLE 6

| EXAMPLE NO. | PERCENT MOISTURE | WEIGHT gram | THICKNESS inch (cm) | DENSITY gram/cc |
|---|---|---|---|---|
| 3-1 | 0 | 5.84 | 0.071 (0.180) | 0.248 |
| 3-2 | 3.8 | 5.68 | 0.041 (0.104) | 0.417 |
| 3-3 | 6.2 | 5.57 | 0.030 (0.076) | 0.559 |
| 3-4 | 7.8 | 5.86 | 0.026 (0.066) | 0.679 |
| 3-5 | 9.8 | 5.93 | 0.031 (0.079) | 0.576 |
| 3-6 | 11.2 | 6.22 | 0.030 (0.076) | 0.625 |
| 3-7 | 12.8 | 6.11 | 0.024 (0.061) | 0.767 |
| 3-8 | 13.8 | 6.03 | 0.022 (0.056) | 0.626 |
| 3-9 | 15.3 | 6.25 | 0.030 (0.076) | 0.628 |
| 3-10 | 17.7 | 6.60 | 0.028 (0.066) | 0.765 |
| 3-11 | 18.1 | 6.66 | 0.027 (0.069) | 0.745 |
| 3-12 | 20.7 | 6.76 | 0.035 (0.089) | 0.582 |
| 3-13 | 21.2 | 6.80 | 0.037 (0.094) | 0.554 |

TABLE 5

| EXAMPLE NO. | AIRLAID COMPOSITE WEIGHT (gsm) | BICOMPONENT FIBER (wt. % of composite) | MOISTURE (wt. % of composite) | ABSORBENCY (g/g) | STANDARD DEVIATION (g/g) |
|---|---|---|---|---|---|
| 2 | 379 | 6.9% | 11.4% | 19.60 | 0.57 |
| C5 | 347 | 6.3% | 10.4% | 15.76 | 0.26 |

Examples 3–1 to 3–17

An airlaid composite sample was made as described above in Example 1 of 400 gsm pulp fiber and 32 gsm (8% by weight of the pulp fiber) bicomponent fiber, except that

TABLE 6-continued

| EXAMPLE NO. | PERCENT MOISTURE | WEIGHT gram | THICKNESS inch (cm) | DENSITY gram/cc |
|---|---|---|---|---|
| 3-14 | 24.2 | 7.25 | 0.042 (0.107) | 0.520 |
| 3-15 | 28.6 | 7.25 | 0.044 (0.112) | 0.496 |
| 3-16 | 30.3 | 7.48 | 0.048 (0.122) | 0.480 |
| 3-17 | 60.3 | 12.71 | 0.065 (0.165) | 0.589 |

Examples 4–1 and 4–2

Composites were made as described above in Example 1 and regain absorbency was tested as shown below in Table 7. Uncalendered absorbency is the absorbency of a sample which was tested after the sample had been heated, but before water add-on and calendering. The sample was tested with a 1 minute soak time, 1 minute drain time, and 1500 ml of water. The calendered absorbency was as described above for a sample of the present invention.

TABLE 7

| EXAMPLE NO. | AIRLAID COMPOSITE WEIGHT (gsm) | BICOMPONENT FIBER (wt % of composite) | MOISTURE (wt % of composite) | UNCALENDERED ABSORBENCY | CALENDERED ABSORBENCY | % REGAIN ABSORBENCY |
|---|---|---|---|---|---|---|
| 4-1 | 493 | 5.3% | 11.4% | 21.37 g/g | 19.43 g/g | 90.9% |
| 4-2 | 222 | 8.7% | 10.7% | 25.75 g/g | 17.32 g/g | 67.3% |

Example 5 and Comparative Example 6

In Table 8, the density was measured for Example 5 which was made as in Example 1 above, except no film was applied and Comparative Example 6 which was made as in Comparative Example 3 above. A density range of 0.5 and 1 g/cc is desired because thin, calendered airlaid composites within this density range exhibit improvement in properties as described above.

TABLE 8

| COMPARATIVE EXAMPLE 6 400 gsm w/ 6% Bicomponent Fiber and 4% Moisture | EXAMPLE 5 482 gsm w/ 5.4% Bicomponent Fiber and 11.6% Moisture |
|---|---|
| 0.077 g/cc | 0.510 g/cc |

Comparative Example 7 and Comparative Example 8

Table 9 shows an improvement in absorbency when the step of compacting the airlaid composite directly after heating is removed and the airlaid composite is cooled prior to calendering. Comparative Example 7 and Comparative Example 8 were made as described above for Example 1 except that both samples were compacted directly after forming the composite on the forming wire and no film was added. Comparative Example 8 was additionally compressed at a pressure of about 200 pli (35.7 kg/linear cm) directly after heating in the oven. Comparative Example 7 represents the average of 2 repetitions while Comparative Example 8 was one repetition and absorbency was tested for a 1 minute soak time, a 3 second drain time, and the sample size was 4×7 inches (10.16×17.78 cm).

TABLE 9

| EXAMPLE NO. | AIRLAID COMPOSITE WEIGHT (gsm) | BICOMPONENT FIBER (wt. % of composite) | MOISTURE (wt. % of composite) | ABSORBENCY (g/g) |
|---|---|---|---|---|
| C7 | 560 | 8.0% | 10.7% | 14.75 |
| C8 | 550 | 8.2% | 9.1% | 10.64 |

Example 6 and Comparative Examples 9–11

It has been hypothesized that prior art poultry absorbent pads made from multi-layered tissue actually pull liquid from (desorb) chicken when the pad (tissue) expands when wet (beyond the film layer) and the tissue comes in contact with the chicken. The fluid lost by a piece of skinless, boneless chicken breast when in contact with various pads was tested and the results are summarized as shown below in Table 10. Comparative Example 9 was an absorbent pad available from Sealed Air Company which was a multi-ply layered structure having an apertured film layer on the top surface of a 17-ply tissue layer, wherein the tissue layer expanded in the x- and y-direction when wet. In testing, the film layer was placed in contact with the chicken breast. Comparative Example 10 was the absorbent pad of Comparative Example 9 except that the tissue layer was in contact with the chicken instead of the film layer. Example 6 was an airlaid composite made according to the present invention as described in Example 1 above (493 gsm basis weight, 5.3% bicomponent fiber, 11.4% moisture,) having a fluid pervious film layer having slits, wherein the composite expanded in the z-direction when wet. Comparative Example 11 was only a layer of film, having a thickness of 0.4 mil, made of polyethylene as available from the Huntsman Company. Comparative Example 11 indicates that no desorption occurs due to the film layer. The original weight of the chicken and the system ("the system" was a closed container which includes the absorbent pad) without the chicken was determined before testing. The test involves placing the chicken in contact with each material within a closed system for 24 hours. The chicken is removed and the weight of the system is determined. The weight added to the system is the fluid lost by the chicken.

Percent weight lost by chicken (%)=[System after test−system before test (g/g)]/Original Weight of Chicken (g)×100

Using farm fresh chicken, the test showed that the chicken in contact with the tissue pad (Comparative Example 9) and the tissue/film absorbent pad (Comparative Example 10) was desorbed by these pads. For the airlaid composite of the present invention (Example 6), less fluid was lost which indicates that the airlaid composite does not cause as much desorption of chicken products as does prior known pads. The film only (Comparative Example 11) is the control sample were no fluid is desorbed.

tive Examples were not calendered and film was not added to any of these samples.

TABLE 11

| CODE | AIRLAID COMPOSITE WEIGHT (gsm) | BICOMPONENT FIBER (wt. % of composite) | MOISTURE (wt. % of composite) |
|---|---|---|---|
| −1 a,b | 467 | 3.6% | 10.7% |
| −2 a,b | 351 | 3.7% | 10.7% |
| C12-3 a,b (see Table 15) | 269 | 3.7% | 10.7% |

Table 12 shows data for composites made without calendering, while Table 13 shows data for composites which are calendered and made according to the present invention. Improvements in tensile strength and stiffness can be seen in the examples of the invention, without significantly compromising absorbency (see Table 15 below).

TABLE 12

| Property | C12-1a | C12-1b | C12-2a | C12-2b |
|---|---|---|---|---|
| MD Dry Tensile Strength (g) | 517 | 292 | 268 | 175 |
| CD Dry Tensile Strength (g) | 295 | 297 | 367 | 227 |
| MD Wet Tensile Strength (g) | 552 | 408 | 288 | 305 |
| CD Wet Tensile Strength (g) | 357 | 316 | 368 | 234 |
| MD Drape Stiffness (cm) | 6.532 | 6.867 | 5.567 | 6.467 |
| CD Drape Stiffness (cm) | 5.717 | 7.133 | 4.833 | 5.333 |
| Thickness | 0.190 | 0.317 | 0.244 | 0.245 |

TABLE 10

| SYSTEM (g) | CHICKEN (G) | SYSTEM AFTER 24 HRS (g) | CHICKEN AFTER 24 HRS (g) | FLUID LOST FROM CHICKEN (g) | % FLUID LOSS/ CHICKEN SAMPLE | % FLUID DESORBED |
|---|---|---|---|---|---|---|
| Example C9 231.32 | 227.76 | 236.35 | 222.61 | 5.03 | 2.21 | 0.63 |
| Example C10 236.74 | 227.00 | 244.00 | 219.63 | 7.26 | 3.20 | 1.62 |
| Example 6 229.69 | 226.62 | 233.91 | 222.78 | 4.22 | 1.86 | 0.33 |
| Example C11 228.96 | 227.79 | 232.56 | 223.87 | 3.60 | 1.58 | 0 |

Examples 7–1 to 7–3 and Comparative Examples 12–1 to 12–3

Table 11 below shows the composition for samples made as described in Example 1 above, except that the Compara- TABLE 12-continued

| Property | C12-1a | C12-1b | C12-2a | C12-2b |
|---|---|---|---|---|
| inches (cm) | (0.483) | (0.852) | (0.620) | (0.622) |
| Density (gram/cc) | 0.088 | 0.056 | 0.054 | 0.057 |

TABLE 13

| Property | 7-1a | 7-1b | 7-2a | 7-2b |
|---|---|---|---|---|
| MD Dry Tensile Strength (g) | 4069 | 3267 | 2644 | 1831 |
| CD Dry Tensile Strength (g) | 3755 | 3182 | 1657 | 3770 |
| MD Wet Tensile Strength (g) | 1029 | 756 | 661 | 522 |
| CD Wet Tensile Strength (g) | 716 | 921 | 463 | 755 |
| MD Drape Stiffness (cm) | 9.883 | N.D. | 9.150 | 6.850 |
| CD Drape Stiffness (cm) | 8.250 | 9.233 | 7.667 | 9.467 |
| Thickness inches (cm) | 0.038 (0.097) | 0.030 (0.076) | 0.025 (0.064) | 0.026 (0.058) |
| Density (gram/cc) | 0.404 | 0.533 | 0.474 | 0.394 |

N.D. = No Deflection

Examples 8–1 to 8–3

Table 14 below shows the composition for samples made as described in Example 7 above except that a 0.4 mil polyethylene film layer was added to Examples 8–1 to 8–3. Table 15 shows absorbency and wet integrity results for Examples 8 (example made according to the present invention including calendering) and Comparative Examples 12 (compositions as shown above in Table 11 and made without calendering). These results indicate that absorbency is not compromised when examples are made according to the present invention.

TABLE 14

| CODE | AIRLAID COMPOSITE WEIGHT (gsm) | BICOMPONENT FIBER (wt. % of composite) | MOISTURE (wt. % of composite) |
|---|---|---|---|
| 8-1 a,b | 478 | 3.3% | 10.7% |
| 8-2 a,b | 362 | 3.3% | 10.7% |
| 8-3 a,b | 280 | 3.2% | 10.7% |

TABLE 15

| Examples | C12-1a | C12-1b | C12-2a | C12-2b | C12-3a | C12-3b |
|---|---|---|---|---|---|---|
| Absorbency (g/g) | 21.70 | 22.24 | — | 18.59 | 23.57 | 20.84 |
| Wet Integrity | Yes | Yes | Yes | Yes | Yes | Yes |
| Examples | 8-1a | 8-1b | 8-2a | 8-2b | 8-3a | 8-3b |
| Absorbency(g/g) | 19.15 | 20.80 | 20.12 | 21.40 | 19.89 | 22.50 |
| Wet Integrity | Yes | Yes | Yes | Yes | Yes | Yes |

Comparative Example 13

As a comparative example, a sample was made according to the composition and process described in commonly assigned U.S. Pat. No. 4,100,324 to Anderson et al. The BCTMP was used as described above, and instead of the bicomponent fiber, 10% by weight of a polypropylene meltblown binder fiber was added to the composition as described in '324. The composite, known as "coform", was formed as otherwise described above in Example 1. Table 16 shows the absorbency of the coform composite which was considerably less than the airlaid composites made according to the present invention.

TABLE 16

| Material | Basis Wt. | Sample | Soak/Drain | Absorbency |
|---|---|---|---|---|
| BCTMP Coform (90% pulp fiber/ 10% meltblown) | 400 GSM | 4" x 6" | 24 hours/ 1 minute | 10.39 g/g |

Having described the various embodiments of the present invention with reference to the accompanying figures, it will be appreciated that various changes and modifications can be made without departing form the scope or spirit of the invention.

We claim:

1. A thin, calendered multi-layered absorbent structure comprising:
   a) a thin, calendered airlaid composite further comprising:
      i) pulp fiber; and
      ii) at least about 2% by weight bicomponent fiber having a first polymer component and a second polymer component, wherein said first polymer component melts at a temperature lower than the melting temperature of said second polymer component, and further wherein said bicomponent fibers are integrally mixed and evenly dispersed with said pulp fibers and said first polymer component is bonded to many of said pulp fibers and bicomponent fibers;
   wherein percent by weight is based on the total weight of i) and ii); and
   at least one sheet layer; wherein said multi-layered absorbent structure has a drape stiffness of at least about 5 cm, an absorbency of at least about 12 g/g, and a dry tensile strength of at least about 1300 grams, and still further wherein calendering is carried out while the airlaid composite comprises about 5% by weight to about 20% by weight moisture.

2. The thin, calendered multi-layered absorbent structure of claim 1 wherein said sheet layer is a film layer, a tissue layer, a meltsprayed layer or a nonwoven layer.

3. The thin, calendered multi-layered absorbent structure of claim 2 wherein said sheet layer is a fluid impervious film layer.

4. The thin, calendered multi-layered absorbent structure of claim 1 wherein said sheet layer is a fluid previous film layer.

5. The thin, calendered multi-layered absorbent structure of claim 3 wherein said fluid impervious film layer is on one side of said thin, calendered multi-layered absorbent structure and further including a fluid previous film layer on the opposite side of said thin, calendered multi-layered absorbent structure.

6. A process of preparing a thin, calenderend airlaid composite comprising:
   a) providing pulp fibers;
   b) integrally mixing and evenly dispersing at least about 2% by weight bicomponent fiber with said pulp fibers, wherein said bicomponent fiber has a first polymer component and a second polymer component and said first polymer component melts at a temperature lower than the melting temperature of said second polymer component, c) forming a airlaid composited with said pulp fibers and said bicomponent fiber without compressing said airlaid composite;

d) heating said airlaid composite thereby melting a portion of said first component of said bicomponent fibers;

e) cooling said airlaid composite thereby bonding many of said bicomponent fibers to said pulp fibers and bicomponent fibers;

f) moisturizing said airlaid composite such that said airlaid composite further comprises sufficient moisture add-on to facllitate further bonding;

then calendering said airlaid composite to form a thin, calendered airlaid composite having a drape stiffness of at least about 5 cn, and absorbency of at least about 12 g/g, and a dry tensile strength of at least about 1300 grams, and wherein percent by weight is based on the total weight of said pulp fibers and bicomponent fibers, and further comprising the step of attaching at least one sheet layer to said airlaid composite to form a multi-layered absorbent structure.

7. The process of claim 6 wherein said sheet layer is attached to said airlaid composite by corona treatment combined with said calendering.

8. The process of claim 7 wherein said moisturizing is provided by a spray atomizer.

9. The process of claim 8 wherein said calendering is conducted in the range of 800 to 4000 pli (143–715 kg/linear cm) and at ambient temperatures.

10. An absorbent article made from the thin, calendered multi-layered absorben structure of claim 1.

11. An absorbent pad for use in shipping envelopes or packages for managing fluids, said absorbent pad made from the thin, calendered multi-layered absorbent structure of claim 1.

12. An absorbent pad for use in food packaging mad from the thin, calendered multi-layered absorbent structure of claim 1.

13. A personal care product made from the thin, calendered multi-layered absorbent structure of claim 1.

* * * * *